May 16, 1961  D. J. ALLEN  2,984,129
METHOD OF AND APPARATUS FOR INSTALLING A VALVE IN A PIPE
Filed Oct. 21, 1958  4 Sheets-Sheet 1
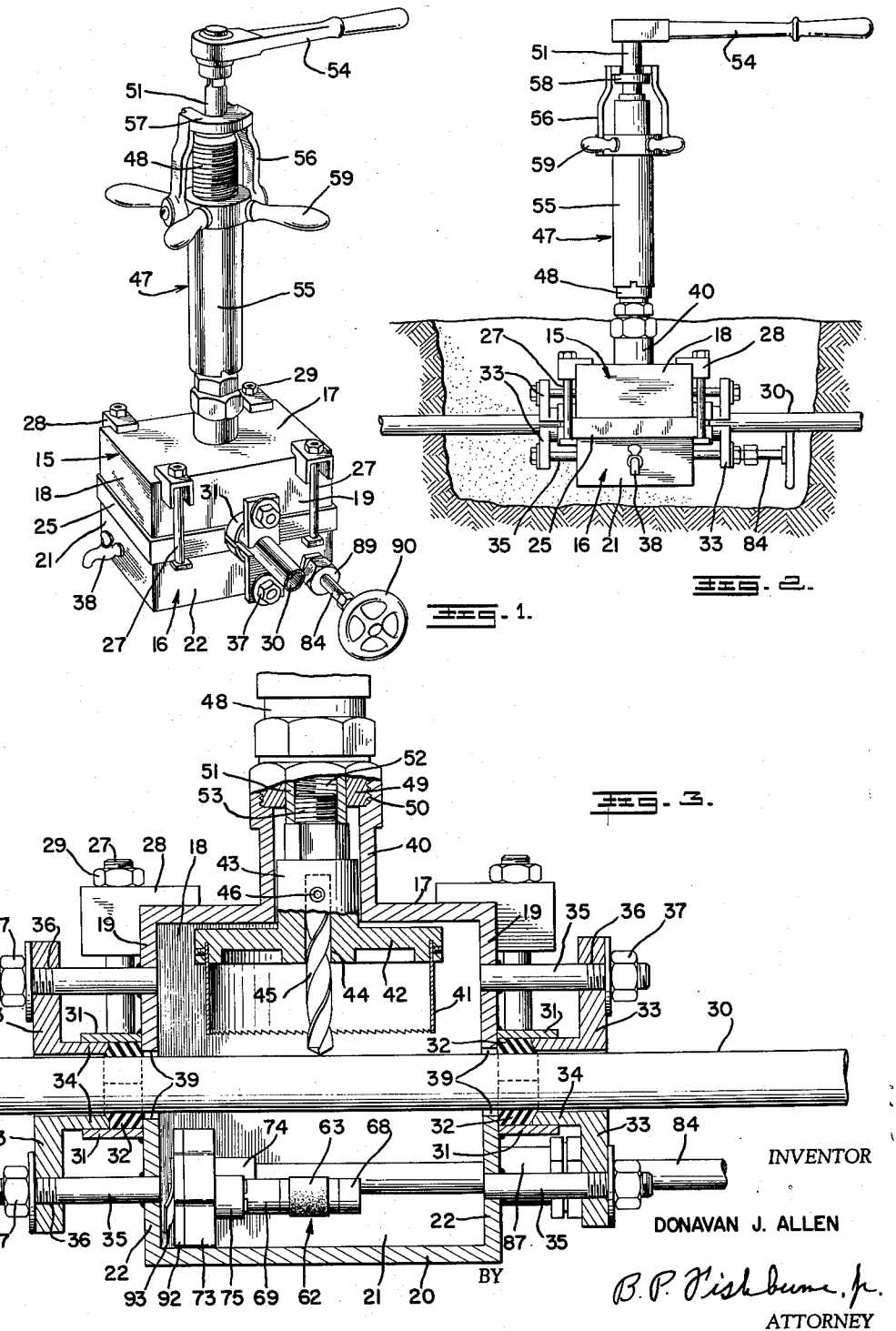

May 16, 1961   D. J. ALLEN   2,984,129
METHOD OF AND APPARATUS FOR INSTALLING A VALVE IN A PIPE
Filed Oct. 21, 1958   4 Sheets-Sheet 2
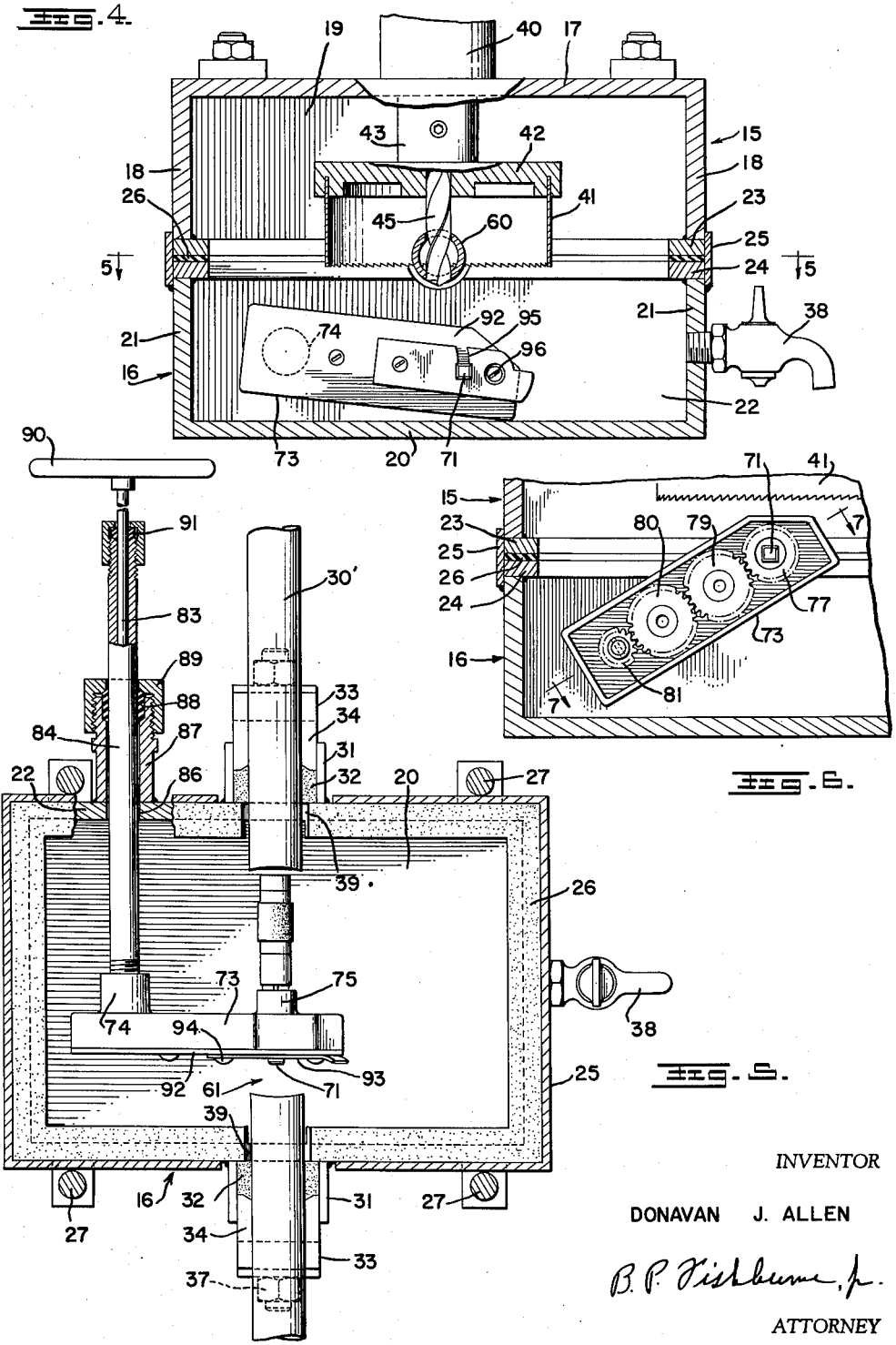
INVENTOR
DONAVAN  J. ALLEN
ATTORNEY

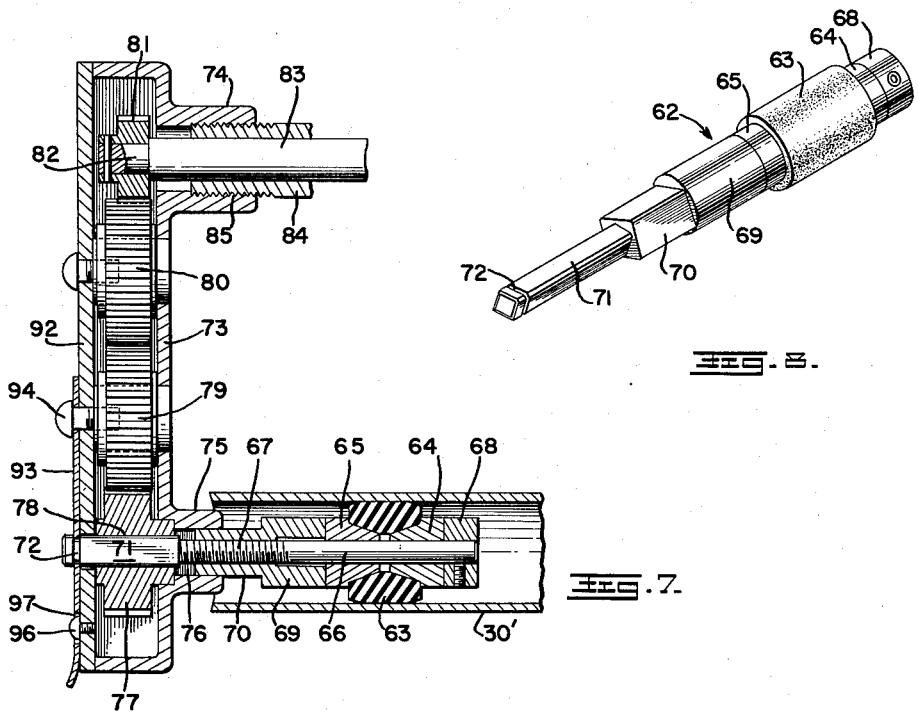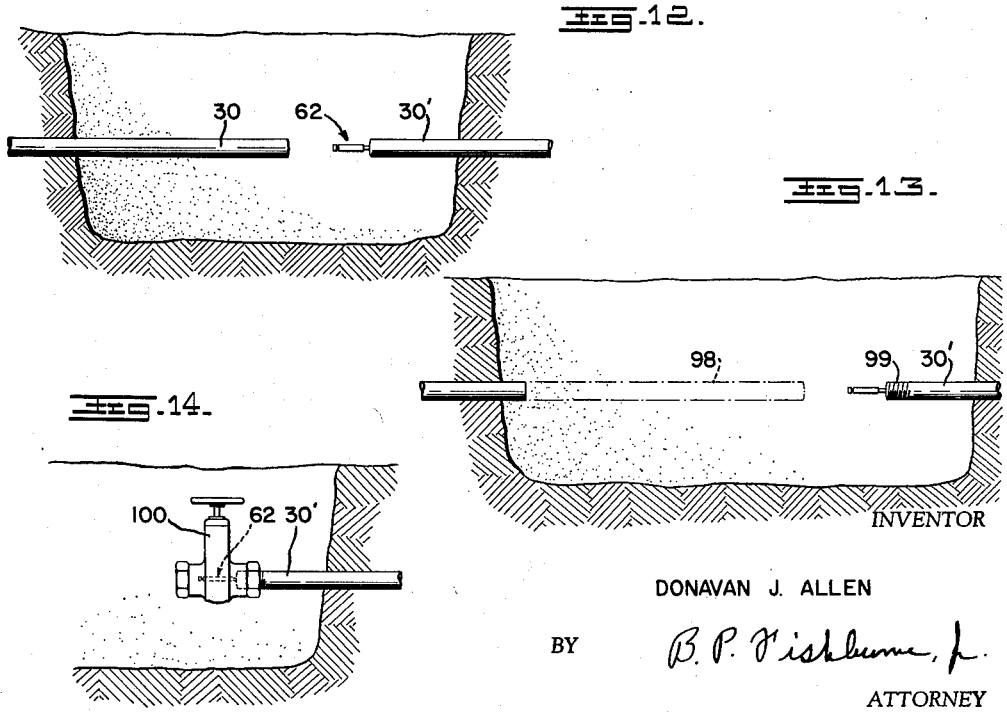

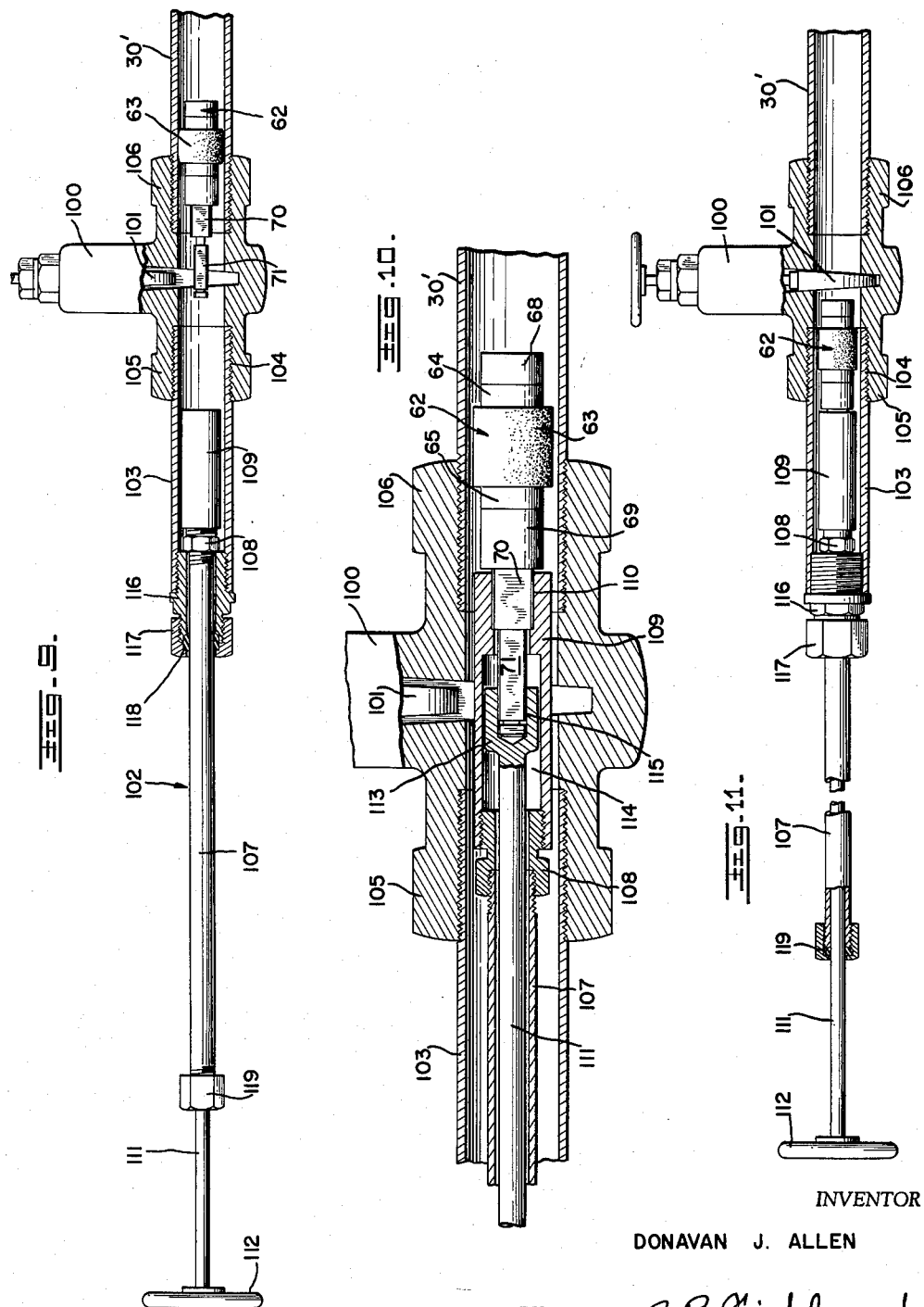

United States Patent Office 2,984,129
Patented May 16, 1961

2,984,129
METHOD OF AND APPARATUS FOR INSTALLING A VALVE IN A PIPE

Donavan J. Allen, 8 Orr Hill, Piedmont, S.C., assignor of one-fourth to Hugh E. Vincent and one-fourth to Fred D. Verner, both of Greenville, S.C.

Filed Oct. 21, 1958, Ser. No. 768,637
11 Claims. (Cl. 77—38)

This invention relates to a method of and apparatus for installing a valve in a pipe containing fluid under pressure.

A primary object of the invention is to provide a simplified and expeditious method of installing valves in pipes or mains containing liquids or gases under pressure, without the escape of the liquids or gases during the installation of the valve, and to also provide novel and simplified apparatus for use in the practice of the method.

A further important object of the invention is to provide a machine or apparatus of the above-mentioned character which is readily portable, and the use of which renders it possible to install a valve, such as a gate valve, in a water pipe or the like in a minimum of time and with the least possible manual labor.

A further object is to provide valve installing means of the above-mentioned character, the use of which will eliminate the need for Dry Ice or similar makeshift expedients commonly employed to stop the flow of liquid in the pipe during the installation of the valve, the present machine also eliminating the need for cumbersome and expensive equipment sometimes employed for the same purpose.

Another object of the invention is to provide an apparatus of the above-mentioned character which may be readily adapted to pipes of different diameters for installing valves in the same.

Still another important object of the invention is to provide valve installing means of the above-mentioned character which permits of the screw-threading of the severed pipe by standard techniques when the valve is installed, and entirely eliminates the need for expensive machined fittings between the valve and pipe, commonly necessary when conventional valve installing equipment is employed.

Further and more general objects of the invention are to provide a machine or apparatus of the above-mentioned character which is highly simplified in construction, easy to operate, rugged and durable, and relatively inexpensive to manufacture.

Other objects and advantages of the invention will become apparent during the course of the following detailed description.

In the accompanying drawings, forming a part of this application, and in which like numerals are employed to designate like parts throughout the same, Figure 1 is a perspective view of a machine or apparatus for use in installing valves according to the invention.

Figure 2 is a side elevation of the machine in use.

Figure 3 is an enlarged fragmentary central vertical section through the machine illustrated in Figure 2.

Figure 4 is a further fragmentary central vertical section through the apparatus taken at right angles to Figure 3 and showing the pipe cutting means in the operative position for cutting the pipe.

Figure 5 is a horizontal section taken approximately on line 5—5 of Figure 4.

Figure 6 is a fragmentary vertical section through the machine or apparatus with the pipe plugging means adjusted to its operative position for plugging the pipe, the cover plate of the gear box of the pipe plugging means being removed for the purpose of illustration.

Figure 7 is an enlarged fragmentary section taken on line 7—7 of Figure 6.

Figure 8 is a perspective view of an expandable plug used in the machine.

Figure 9 is a side elevational view, partly in section, of the pipe plug and plug extractor, and showing the latter connected with a gate valve which has been mounted upon the pipe having the plug therein.

Figure 10 is an enlarged central vertical longitudinal section through the gate valve, plug and plug extractor and showing the engagement of the plug extractor with the plug, prior to removing the latter from the pipe.

Figure 11 is a further view similar to Figure 9, partly in section, illustrating the manner in which the plug is extracted from the pipe by the plug extractor and showing the gate valve closed.

Figures 12, 13 and 14 are further partly diagrammatic elevational views of the cut pipe and pipe plug, and illustrating the manner in which the pipe may be threaded and the gate valve installed prior to the extraction of the plug.

In the drawings, wherein for the purpose of illustration is shown a preferred embodiment of the invention, the numerals 15 and 16 designate a companion pair of separable rectangular box-like casing sections, formed of cast iron, steel or the like. As shown clearly in Figure 4, the opposed sides of the casing sections 15 and 16 are open, and the casing section 15 comprises a top wall 17, and side and end walls 18 and 19. The walls 17, 18 and 19 are integrally joined in a fluid tight manner. The casing section 16 similarly embodies a bottom wall 20 and side and end walls 21 and 22, said walls being likewise integrally joined in a fluid tight manner. As shown in the drawings, the casing sections 15 and 16 may be assembled together in opposed relationship to form a rectangular box-like fluid tight casing.

The casing sections 15 and 16 are provided at their open sides with marginal rectangular flanges 23 and 24, rigid therewith, and the casing section 16 carries an exterior marginal flange 25, at right angles to the flange 24, and projecting above the same for guiding the casing section 15 into opposed assembled relation with the casing section 16. A compressible fluid tight gasket 26 is mounted upon the flange 24 and extends about all four sides of the casing, Figure 5, and this gasket is engaged by the flange 23 of casing section 15 in assembly.

The casing sections 15 and 16 are rigidly secured together in opposed relation by corner bolts 27, rigid with the casing section 16, and engaging through apertured lugs 28 of the casing section 15, to which the lugs are rigidly secured. Nuts 29 are received by the bolts 27 to form a detachable connection between the two casing sections 15 and 16.

The separable casing sections 15 and 16 are provided with adjustable fluid tight packing gland means to embrace the pipe 30 in which the gate valve is to be installed. Each casing section 15 and 16 is provided upon its end walls with a pair of axially aligned semi-cylindrical sleeve portions 31, or seats, rigidly secured by welding or the like to the casing sections. The semi-cylindrical sleeve portions 31 of casing section 15 and the corresponding sleeve portions 31 of casing section 16 are arranged in opposed relation, with their open sides innermost when the casing sections 15 and 16 are assembled as shown in Figure 1. Each companion pair of the sleeve portions 31 on opposite ends of the box-like casing thus constitute a substantially cylindrical tubular extension or sleeve for the adjustable packing gland means.

Within each sleeve portion 31 is disposed a semi-cylindrical compressible packing gland section 32, and the packing gland sections 32 at each end of the casing are arranged in opposed relation to each other, corresponding to the opposed relation of the sleeve portions or seats 31. A pair of L-shaped adjusting or compressing elements 33 for the packing gland sections 32 is provided at each end of the casing, and the companion pairs of adjusting elements 33 are also arranged in diametrically opposed relation, as shown. Each element 33 includes a cylindrically curved portion 34 extending axially of the pipe 30 and packing gland, and engaging interiorly of the opposed sleeve portions 31 as shown clearly in Figure 3. Mounting and adjusting bolts 35 for the elements 33 are rigidly secured to the end walls 19 and 22 of the casing sections 15 and 16, and the elements 33 are apertured at 36 to receive these bolts 35. Adjusting nuts 37 are carried by the bolts 35, outwardly of the elements 33, to adjust the latter axially of the pipe 30 for compressing the packing gland sections 32 in order to provide a fluid tight seal between the pipe 30 and casing sections 15 and 16.

It should be mentioned here that the packing gland means shown in the drawings and described is of a size to accommodate the pipe 30, which may be a three-quarter inch or a one inch water pipe or the like. However, the packing gland means may be varied in size throughout a wide range to accomodate pipes of various diameters, as required. If desired, the compressible packing gland sections 32 may be provided with the machine in sets having different internal diameters. Thus, a packing gland of one inside diameter may be readily substituted for another of a different inside diameter within the sleeve portions or seats 31. The diameters of the sleeve portions 31 may also be varied upon the machine as found desirable, to adapt the machine to a wide range of pipe sizes.

The casing section 16 is further provided in one side wall 21 thereof with a pet-cock 38 for a purpose to be described.

It should now be apparent that the companion casing sections 15 and 16 may be separated and placed upon opposite sides of the pipe 30, which is to be cut in preparation for having a gate valve inserted therein. The pipe 30 is received by the split adjustable packing gland means, and extends through the box-like casing from end-to-end thereof, at the center of the same. The end walls 19 and 22 of the casing sections are of course provided with opposed semi-circular openings 39, Figure 3, to accommodate the pipe 30. When the nuts 29 on the bolts 27 are securely tightened, the fluid tight gasket 26 is under compression and a seal is afforded between the two casing sections around all four sides of the same. Likewise, when the nuts 37 are tightened, the packing gland sections 32 are compressed axially and grip the pipe 30 in a fluid tight manner to provide a fluid tight seal between the pipe and the interior of the box-like casing.

Means are provided to cut a section from the pipe 30 inside of the casing of the machine. To this end, an upstanding tubular extension 40 is formed integral with the top wall 17 of casing section 15. A circular saw 41 of substantial diameter is positioned centrally within the casing section 15, and rigidly secured to a carrier plate 42, having a hub 43 projecting inside of the tubular extension 40 as shown in Figure 3. The hub 43 has a downwardly opening central bore 44, receiving a pilot drill 45, rigidly held therein by a set screw 46. The nose of the pilot drill 45 projects somewhat forwardly of the cutting edge of the circular saw 41, as best shown in Figure 3.

Means are provided to rotate the circular saw 41 and pilot drill 45 and to feed the same toward the pipe 30. Such means is shown generally at 47, and may be of conventional and well-known construction. The rotating and feed means 47 for the saw and pilot drill includes a tubular screw-threaded member 48, having a lower screw-threaded extension 49, secured within a screw-threaded opening 50 in the upper end of tubular extension 40. A rotatable bar 51 extends through and is journaled within the member 48, and is provided at its lower end with a screw-threaded opening 52, receiving and having screw-threaded engagement with a reduced screw-threaded extension 53 on the upper end of the hub 43.

A conventional ratchet handle 54 is detachably secured to the upper end of rotatable bar 51 to turn the latter, and rotation of the bar 51 will serve to turn the drill 45 and annular saw 41 in unison. A feed nut 55 upon the screw-threaded member 48 carries a pivoted yoke 56 including a thrust collar 57, which bears against a shoulder 58 on the bar 51. The nut 55 has handle means 59 to turn the same, and rotation of the nut 55 serves to feed the rotary bar 51 downwardly within the tubular member 48 for moving the saw 41 and pilot drill 45 toward and through the pipe 30. As previously mentioned, the construction and operation of the feed means 47 is conventional and well-known and need not therefore be further described in this application. The entire feed means 47 is readily detachable from the casing section 15 at the screw-threaded connection 49—50 between the lower end of the member 48 and the tubular extension 40. The hub 43 is likewise readily detachable from the lower end of the rotary bar 51.

It should now be apparent that when the casing sections 15 and 16 are clamped about the pipe 30 in the manner shown and described, the pilot drill 45 and the saw 41 may be operated through the medium of the ratchet handle 54 and feed handle 59 to cut a section out of the pipe 30, equal in length to the diameter of the saw 41. This operation of cutting the pipe is illustrated particularly in Figure 4, wherein the pilot drill 45 first drills a hole in the pipe 30 and the annular saw 41 following the pilot drill then cuts a section from the pipe 30 within the box-like casing of the machine. The pipe section 60, Figure 4, thus cut from the pipe 30 will enter the annular saw 41 and remain therein due to frictional engagement with the saw and the pilot drill 45. After the pipe has been cut, the saw and pilot drill may be retracted upwardly to their positions shown in Figure 3, and the cut pipe section 60 will thus be elevated from the pipe 30, leaving a gap or opening in the pipe such as shown at 61 in Figure 5.

When the pipe is thus cut, the water or other fluid under pressure in the pipe will enter the box-like casing of the machine and be contained therein against leakage by the gasket and packing gland means previously described. The pet-cock 38 is closed at this phase of the operation.

Means are provided upon the machine to plug the upstream or high pressure side of the cut pipe 30. Such means comprises an expandable pipe plug shown generally at 62 in Figure 8. The plug proper comprises an annular compressible gland or seal 63, engaging over the inner opposed tapered portions of axially movable conical expander elements 64 and 65, slidably mounted upon a rod 66 having a screw-threaded portion 67, Figure 7. A collar 68 is fixedly secured to one end of the rod 66, outwardly of the expander element 64 and engaging the end of the latter. A nut 69 on the screw-threaded rod portion 67 has a rectangular extension 70, as shown, and the rod 66 has formed integral therewith beyond the screw-threaded portion 67 a square extension 71, considerably smaller than the extension 70 and projecting axially beyond the same. The reduced extension 71 is provided near its free end with a detent groove 72, as shown. The rod 66 including the square extenseion 71 is rotatable relative to the nut 69 and its square extension 70. When the extension 70 of the nut 69 is gripped and held against rotation while rotation is applied to the extension 71, relative axial movement of the conical expander elements 64 and 65 is obtained for expanding or contracting the pipe plug or seal 63, as should now be obvious.

The pipe plug 62 is initially arranged inside of the casing section 16, and means are provided on the casing section 16 to manipulate the plug 62 and insert it in the high pressure portion of the cut pipe 30, while the latter is embraced by the casing sections 15 and 16. The means for manipulating the pipe plug 62 comprises a gear box 73 disposed within the casing section 16, and provided upon one side and near opposite ends thereof with tubular bosses 74 and 75. The boss 75 has a square opening 76 formed therethrough for the reception of the square extension 70 of nut 69, Figure 7. A first spur gear 77 journaled within the gear box 73 near one end thereof has a square bore 78 to receive the reduced square extension 71 of the rod 66. A pair of idler gears 79 and 80 are journaled within the gear box 73, intermediate its ends, and the gear 79 meshes with the gear 77 and the gear 80, as shown. A further gear 81 adjacent to the tubular boss 77 meshes with the gear 80 and is fixedly secured to a reduced extension 82 of an elongated rotary shaft 83 within the gear box 73. The shaft 83 is rotatably mounted within a tube or pipe 84, the inner end of which has screw-threaded engagement at 85 within the bore 74, and is thereby rigidly secured to the latter.

The tube 84 and shaft 83 extend through an opening 86 in one end wall 22 of the casing section 16, and through a sleeve 87 fixedly secured to the casing section 16 in a fluid tight manner by welding or the like. The sleeve 87 contains a packing gland 88 having an adjusting nut 89, and the tube 84 and shaft 83 extend axially beyond the nut 89 as clearly shown in Figure 5. The tube or pipe 84 carrying the rotatable shaft 83 is axially shiftable through the sleeve 87 and packing gland 88. The entire gear box 73 and associated elements is bodily carried by the tube 84 and shiftable and rotatable therewith. The shaft 83 is provided at its outer end with an operating handle 90, which is used to turn the shaft 83 and also to shift this shaft and the tube or pipe 84 axially of the sleeve 87. A further seal or gland 91 is preferably provided between the outer end of the tube 84 and the shaft 83, as shown in Figure 5, but this seal may be omitted if preferred because any leakage around the shaft 83 would be negligible.

When the pipe plug 62 is connected with the gear 77 and gear box, as shown in Figure 7, the groove 72 in the square extension 71 is disposed just beyond the outer face of the gear box cover plate 92. A movable catch or detent element 93, in the form of a strip of spring steel or the like, is pivotally secured near one end to the cover plate 92, as at 94. The catch 93 is provided in one edge with an arcuate slot 95, engageable with the groove 72 of extension 71 to releasably secure the pipe plug assembly 62 to the gear box 73, as shown. The catch 93 is preferably releasably secured in the active or locking position by a projection 96 on the gear box, which may engage within an opening 97 of the movable catch 93. When the catch 93 is disengaged from the groove 72 by pivoting the catch upon its pivot 94, the entire pipe plug unit 62 may be separated from the gear 77 and the gear box 73.

In order to plug the high pressure portion of the previously cut pipe 30, it is merely necessary to grasp the handle 90 and/or the tube 84 and turn the same for swinging the entire gear box 73 from its lowered position shown in Figure 4 to the upwardly inclined position of Figure 6, where the pipe plug assembly 62 is axially aligned with the cut pipe 30. When this condition has been achieved, the handle 90 is pulled axially outwardly for shifting the tube 84 in the same direction with the gear box 73 and pipe plug unit 62. This will effect the introduction of the pipe plug 62 into the high pressure part 30', Figure 5, of the cut pipe. The seal 63 of the pipe plug is at this time in the contracted condition.

When the pipe plug 62 is within the pipe section 30', Figure 7, the handle 90 is rotated for imparting rotation to the shaft 83 and spur gear 81. This will drive the gear train composed of the gears 80, 79 and 77, and the latter gear will impart rotation to the rod 66, due to its connection with the square extension 71 of this rod. The nut 69 cannot rotate at this time, due to the engagement of its square extension 70 within the square opening 76 of the gear box boss 75. Accordingly, the rotation of the shaft 83 and the rod 66 in the proper direction will cause the plug expander elements 64 and 65 to move together axially, for expanding the packing or seal 63 of the pipe plug within the pipe section 30. This will instantly and effectively cut off the flow of water from the high pressure portion of the cut pipe.

When this has been done, in order to test the effectiveness of the pipe plug, it is merely necessary to open the pet-cock 38, to allow the escape of the fluid from the box-like casing. When the fluid flow from the pet-cock 38 quickly ceases after the draining of the casing, the operator will be certain that the pipe has been properly plugged and that there is no danger of further flow of the fluid, such as water.

At this time, the entire casing section 15 may be removed from the casing section 16, with the feed device 47, saw 41 and associated elements. With the other casing section 16 now exposed, the pivoted catch 93 is operated to disengage the slot 95 from the detent groove 72, and as soon as this has been done, the gear box 73 may be disconnected from the pipe plug unit 62 by merely shifting the tube 84 axially inwardly. The entire casing section 16 and associated elements including the gear box 73 may now also be removed from the cut pipe, and the casing sections 15 and 16 have no further use in the operation of installing the valve in the pipe.

With reference to Figures 9 through 14 of the drawings, and Figure 12 in particular, the high pressure portion 30' of the pipe is shown having the pipe plug unit 62 secured therein. As shown in Figure 13, an additional portion 98 of the pipe may be cut off or slightly bent to one side, as preferred, to make clearance for the means for extracting the plug from the pipe and completing the installation of the gate valve.

As shown in Figure 13, the pipe section 30' is now screw-threaded at 99 by the use of conventional pipe threading means not shown. When this has been done, a conventional gate valve 100, Figure 14, is screwed onto the screw-threaded portion 99 of pipe section 30', and the valve gate 101, Figure 9, is now in the open position. The plug unit 62 is still within the pipe section 30'.

With continued reference to Figures 9 through 11, there is provided a plug extractor device shown generally at 102, and including a short pipe section 103, screw-threaded at its forward end, as shown at 104. The screw-threaded end 104 of pipe section 103 is now screw-threaded into the opposite end or fitting 105 of the gate valve 100, the pipe section 30' being shown in Figure 9 already screw-threaded into the opposite end or fitting 106 of the gate valve, and the plug unit 62 being shown within the pipe section 30'.

The plug extractor 102 further comprises an elongated tube 107, rigidly connected through a screw-threaded coupling element 108 with a tubular socket element 109, having a square opening 110 in its forward end to receive the square extension 70 of the pipe plug unit 62. The socket element 109 is rigid with the tube 107.

Rotatable and slidable within the tube 107 is an elongated shaft 111, having a handle 112 to facilitate turning the same. The shaft 111 projects through the bore of coupling 108 and is provided at its forward end with a head 113, disposed within an enlarged bore portion 114 of socket element 109. The head 113 is provided in its forward end with a square opening 115, adapted to receive the square extension 71 of the plug unit 62.

The outer end of the pipe section 103 of plug extractor 102 carries a tubular nipple 116, affording a stop for engagement with the coupling element 108 to limit axial shifting of the same in one direction. The outer end of the nipple 116 carries a nut 117, having a packing gland or seal 118 for the tube 107. As shown in Figure 11, a further seal 119 may be provided between the shaft 111 and the tube 107, at the outer end of the latter. It should be understood the tube 107 is axially slidable through the nipple 116 and pipe section 103, and the shaft 111 is rotatable within the tube 107 and socket element 109 and also axially shiftable somewhat through the tube 107, in amount limited by the length of the bore portion 114.

While the valve gate 101 is open, Figures 9 and 10, the plug extractor 102 is applied to the valve 100 as in Figure 9; and the tube 107 and associated elements are now shifted axially inwardly to the position shown in Figure 10, wherein the socket element 109 engages over the square extension 70 and the head or socket 113 likewise engages over the square extension 71 of the plug unit 62. When this condition is reached, the tube 107 is restrained against rotation and the handle 112 is turned for rotating the shaft 111 within the tube 107. This causes rotation of the square extension 71 relative to the extension 70, which cannot rotate because of its engagement within the square socket 110. Thus, turning of the handle 112 in the proper direction will now effect a reduction in diameter or contraction of the seal 63 of plug unit 62, the operation of which should be obvious in the light of the previous description in connection with Figure 7.

As soon as the seal 63 has been contracted, Figures 10 and 11, the tube 107 of the plug extractor may be pulled axially outwardly, and the socket element 109 will carry the plug unit 62 out of the pipe section 30' and beyond the gate 101 of the gate valve as clearly indicated in Figure 11. At this time, the gate valve may be closed as indicated in Figure 11 to block the flow of fluid from the high pressure pipe 30'. In the short interval between the extraction of the plug unit 62 from the pipe section 30' and the closing of the valve gate 101, the fluid cannot escape from the pipe 30' or gate valve due to the seals 118 and 119 of the extractor mechanism 102.

With the gate valve 100 thus closed and the extracted plug unit 62 held within the socket element 109, it is merely necessary now to remove the pipe section 103 from the fitting 105 of the gate valve, and the operation of installing the gate valve in the pipe is virtually complete.

To complete the installation of the valve, it is now merely necessary to replace the cut-out section 98 of the pipe and to join the same to the gate valve 100 and pipe 30 by means of conventional screw-threaded unions, or the like.

With the use of the present machine, including the plug extractor 102, a valve such as a gate valve may be installed in a pipe containing fluid under pressure in a few minutes time, and without the necessity for using Dry Ice or the like to stop the flow of fluid into the pipe or expensive machinery for this purpose. After the pipe has been plugged by the machine and the casing sections 15 and 16 have been removed from the pipe, the pipe may be threaded in a conventional manner and the plug may be extracted and the valve completely installed without fear of leakage during the installation operation. The machine is highly simplified in construction, readily portable and highly convenient to use. It does not require any separate tools for operation, except a simple wrench to manipulate the several nuts 29 and 37. The entire apparatus may be conveniently carried in a plumber's truck, or the like, and the machine may be transported in the assembled condition of Figure 1 or with the parts separated as should be readily apparent.

It is to be understood that the form of the invention herewith shown and described is to be taken as a preferred example of the same, and that various changes in the shape, size and arrangement of parts of the apparatus, or variations in the method steps, may be resorted to, without departing from the spirit of the invention or the scope of the subjoined claims.

Having thus described my invention, I claim:

1. Apparatus for use in installing a valve in a pipe containing fluid under pressure comprising a companion pair of casing sections to be clamped about the pipe in fluid sealing engagement therewith, means carried by one casing section and operable to cut an axial section from the pipe within the casing sections, an expandable pipe plug, and movable means carried by one casing section and detachably secured to the pipe plug and shiftable therewith in one direction for inserting the pipe plug axially into a section of the cut pipe, said movable means including a rotary part operable to expand the pipe plug into fluid sealing engagement with the pipe after the pipe plug is inserted therein.

2. Apparatus for use in installing a valve in a pipe containing fluid under pressure comprising a pair of companion casing sections adapted to be clamped about the pipe in fluid sealing engagement therewith, rotary cutter means carried by one casing section and operable to cut an axial section from the pipe inside of said casing sections, an expandable pipe plug, said plug having a rotary part operable to expand the plug, gearing arranged within said casing sections and connected with said rotary part of the pipe plug to operate the same, a rotary shaft connected with said gearing and extending exteriorly of the casing sections and being manually operable, a tube receiving said shaft and slidably mounted upon one of said casing sections and shiftable axially to move the gearing and said pipe plug axially toward and from one section of the cut pipe, movement of said tube in one direction effecting axial insertion of the pipe plug into said cut pipe section, turning of said shaft in one direction causing expanding of the pipe plug inside of said cut pipe section, and releasable means interconnecting said gearing with the rotary part of the pipe plug and operable to permit separation of the pipe plug from said gearing after separation of said casing sections.

3. Apparatus for use in installing a valve within a pipe containing fluid under pressure comprising a companion pair of casing sections engageable about the pipe to enclose a section thereof, adjustable packing gland means upon said casing sections to form a fluid tight seal between the pipe and casing sections, rotary cutter means upon one casing section and engageable with the pipe within the casing sections to cut an axial section from the pipe, an axially shiftable member slidably mounted upon one casing section substantially at right angles to the axis of said cutter means and extending inside of the casing sections and having a rotary part operable from the exterior of the casing sections, gearing mounted upon said axially shiftable member within said casing sections and connected with said rotary part and operated thereby, and an expandable pipe plug detachably connected with said gearing and extending axially of the pipe and including a rotary part operated by said gearing to cause expansion of the pipe plug after the same has been inserted axially within one cut section of the pipe by axial shifting of said member in one direction.

4. Apparatus for use in installing a valve in a pipe containing fluid under pressure comprising a separable casing engageable around the pipe for enclosing a section of the pipe, cutter means carried by said casing and operable to cut an axial section from the pipe within said casing, an expandable pipe plug, and movable means carried by said casing and detachably connected with the pipe plug and operable to insert the pipe plug axially within one cut axial section of the pipe and to subsequently expand the pipe plug within said cut section of the pipe, said movable means detachable from the pipe plug after separation of the casing from the pipe and leaving the expanded pipe plug within said cut axial section of the pipe.

5. Apparatus for use in installing a valve in a pipe containing fluid under pressure comprising a pair of casing sections to be clamped about the pipe in fluid tight engagement therewith, cutter means carried by one casing section and operable to cut an axial section from the pipe within said casing sections, an expandable plug including a rotary part and a part to be held against rotation, a gear box, gearing within the gear box and including a gear detachably secured to said rotary part of the pipe plug, said gear box including socket means to receive said part of the pipe plug to be held against rotation and holding the same against rotation, said gear box and gearing disposed within the casing sections, a member carrying said gear box and slidably connected with one casing section for reciprocation and extending exteriorly thereof substantially at right angles to the axis of said cutter means and being shiftable to move the gear box with the pipe plug axially toward and from the cut pipe section to be plugged, and a rotary part connected with said gearing and journaled upon said member and adapted to operate the gearing for effecting rotation of the rotary part of said plug to expand the plug while said part of the plug to be held against rotation is so held.

6. Apparatus for installing a valve in a pipe containing fluid under pressure comprising separable fluid tight casing means adapted to enclose a portion of the pipe, cutter means mounted upon said casing means and operable to cut an axial section out of the pipe within the casing means, a pipe plug, mechanism connected with the casing means and supporting the pipe plug inside of the casing means and operable to first align the pipe plug with the high pressure part of the cut pipe and to then insert the pipe plug axially within the high pressure part of the cut pipe and to then expand the plug within such part of the pipe, and releasable interconnecting means between the pipe plug and said mechanism to allow separation of the mechanism from the pipe plug upon removal of the casing means from the pipe.

7. Apparatus for use in installing a valve in a pipe containing fluid under pressure comprising a companion pair of casing sections engageable about the pipe in opposed relation to enclose a portion of the pipe, means for detachably securing the casing sections together in pipe enclosing relation, adjustable packing gland means carried by opposite ends of the casing sections and engaging the pipe to form a fluid tight seal between said casing sections and the enclosed portion of the pipe, rotary cutter means mounted upon one casing section substantially at right angles to the axis of the pipe, feed means connected with the cutter means and operable to cause the cutter means to cut an axial section from the enclosed portion of the pipe within the casing sections, an expandable pipe plug within said casing sections and insertable axially into the high pressure part of the cut pipe and including a rotary part and a part to be held against rotation when the plug is expanded and contracted, a member slideably mounted for reciprocation upon one casing section in spaced parallel relation to the pipe and extending into said casing section, said member being shiftable axially and longitudinally of the pipe, a rotary shaft journaled upon said member, driving connecting means within said casing section between the rotary shaft and the rotary part of the pipe plug, said driving connecting means bodily mounted upon said member within said casing section, an element carried by the driving connecting means and engaging said part of the pipe plug to be held against rotation and holding such part against rotation, and releasable catch means on the driving connecting means and engaging the rotary part of the pipe plug and movable to release the pipe plug from the driving connecting means after the pipe plug has been inserted axially in the high pressure part of the cut pipe and expanded.

8. Apparatus for use in installing a valve in a pipe containing fluid under pressure comprising a companion pair of casing sections adapted to be clamped about the pipe in fluid sealing engagement therewith for enclosing a portion of the pipe, an annular rotary cutter journaled upon one casing section near one side of the pipe and adapted to cut an axial section from the pipe within the casing sections, rotary feed means carried by said one casing section and connected with said cutter to operate the same, a reciprocatory tubular member mounted upon one casing section and extending inside of and outside of said casing section and disposed substantially at right angles to the axis of said cutter and feed means, said reciprocatory member being parallel to the pipe, a gear box carried by one end of the reciprocatory member within the casing sections and movable with the member, a train of gears journaled within the gear box, a rotary shaft journaled within the bore of the tubular reciprocatory member and connected with one of said gears to turn the same, said shaft extending exteriorly of the casing sections, an expandable pipe plug disposed within the casing sections axially of the cut pipe and including a rotary part and a part to be held against rotation when the pipe plug is expanded or contracted, said rotary part detachably coupled to another of said gears within the gear box, an element carried by the gear box and detachably engaging said part of the pipe plug to be held against rotation and holding such part against rotation, whereby said reciprocatory member and rotary shaft may be manipulated exteriorly of the casing sections to first align the pipe plug axially with one cut section of the pipe and then insert the pipe plug axially therein and subsequently expand the pipe plug for blocking the flow of fluid in said cut pipe section.

9. Apparatus for use in installing a valve in a pipe containing fluid under pressure according to claim 8, and a pet-cock connected in one of said casing sections to relieve the fluid pressure therein subsequent to the insertion of the pipe plug into said one cut section of the pipe.

10. Apparatus for installing a valve in a pipe containing fluid under pressure comprising casing means adapted to be removably mounted upon the pipe for enclosing a portion of the pipe, manually operable cutter means mounted upon the casing means for cutting an axial section from the pipe inside of the casing means, an expandable pipe plug, said plug comprising an annular expandable and contractable seal, a pair of opposed tapered elements engageable within the opposite ends of the bore of said seal and shiftable axially relative to each other for expanding and contracting the seal, a screw-threaded rod carrying the tapered elements and seal and having a collar abutting the outer end of one tapered element, said rod having a polygonal portion to be engaged for turning the rod, a nut having screw-threaded engagement with the screw-threaded rod and abutting the outer end of the other tapered element and having a polygonal portion to be engaged for holding the nut against rotation, and manually operable means mounted upon the casing means and extending exteriorly thereof and detachably engageable with said polygonal portions of the rod and nut within the casing means and operable to align the pipe plug axially with one section of the cut pipe and to then insert the plug axially into said cut section and to then expand the plug.

11. Apparatus for use in installing a valve in a pipe containing fluid under pressure comprising companion separable casing sections engageable about the pipe and having a fluid tight union therewith, annular rotary cutter means journaled upon one casing section substantially at right angles to the axis of the pipe and engageable with the pipe inside of said casing sections to cut and remove an axial section of considerable length from the pipe, a member rotatably and reciprocatively mounted upon the other casing section in spaced substantially parallel relation to said pipe, gearing secured to said member for movement therewith inside of said casing sections and extending transversely of said member and having a driven part axially alignable with the cut pipe when said member is turned in one direction upon its longitudinal axis, rotary means carried by said member and connected with said gearing to drive the same, an expandable pipe plug for connection with said driven part of the gearing and insertable axially into the high pressure portion of the cut pipe when said member and gearing are shifted axially of the pipe in one direction within said casing sections, said plug then being expandable inside of said cut pipe by rotation of said means associated with said member, and releasable means carried by said gearing and engaging a part of said expandable plug for detachably securing the plug to said gearing and allowing separation of the plug from the gearing after expansion of the plug in said cut pipe.

References Cited in the file of this patent

UNITED STATES PATENTS

| | | |
|---|---|---|
| 358,445 | Hall | Mar. 1, 1887 |
| 587,092 | French | July 27, 1897 |
| 1,045,289 | Hill | Nov. 26, 1912 |
| 1,280,813 | Mueller et al. | Oct. 8, 1918 |
| 1,743,338 | Field | Jan. 14, 1930 |
| 1,885,593 | Downer | Nov. 1, 1932 |
| 2,176,260 | Johnson | Oct. 17, 1939 |
| 2,462,748 | Johnson | Feb. 22, 1949 |
| 2,787,051 | Risley | Apr. 2, 1957 |
| 2,867,897 | Emanueli | Jan. 13, 1959 |
| 2,899,983 | Farris | Aug. 18, 1959 |
| 2,906,295 | Ver Nooy | Sept. 29, 1959 |